United States Patent
Joseph

(10) Patent No.: US 7,197,320 B2
(45) Date of Patent: Mar. 27, 2007

(54) SYSTEM FOR MANAGING TRAFFIC PATTERNS USING CELLULAR TELEPHONES

(76) Inventor: Joseph Joseph, 470 Kent Ave., Brooklyn, NY (US) 11211

( * ) Notice: Subject to any disclaimer, the term of this patent is extended or adjusted under 35 U.S.C. 154(b) by 68 days.

(21) Appl. No.: 10/613,001

(22) Filed: Jul. 2, 2003

(65) Prior Publication Data

US 2005/0003802 A1   Jan. 6, 2005

(51) Int. Cl.
*H04Q 7/20* (2006.01)

(52) U.S. Cl. .............................. 455/456.1; 455/414.2; 455/414.3; 455/456.2; 455/456.3; 455/457

(58) Field of Classification Search ............ 455/456.1, 455/457, 456.2, 456.6, 456.3, 414.2, 414.3, 455/404.2; 701/117, 200
See application file for complete search history.

(56) References Cited

U.S. PATENT DOCUMENTS

| | | | |
|---|---|---|---|
| 5,327,144 A | | 7/1994 | Stilp et al. |
| 5,563,783 A | | 10/1996 | Stolfo et al. |
| 5,732,383 A | * | 3/1998 | Foladare et al. ......... 455/456.5 |
| 6,091,956 A | * | 7/2000 | Hollenberg .............. 455/456.5 |
| 6,330,452 B1 | | 12/2001 | Fattouche et al. |
| 6,711,408 B1 | * | 3/2004 | Raith ......................... 455/440 |
| 2002/0077748 A1 | * | 6/2002 | Nakano ...................... 701/209 |
| 2002/0107634 A1 | * | 8/2002 | Luciani ...................... 701/117 |
| 2003/0052797 A1 | * | 3/2003 | Rock et al. ................. 340/936 |
| 2003/0163253 A1 | * | 8/2003 | Lee et al. ................... 701/209 |
| 2003/0195702 A1 | * | 10/2003 | Koga ......................... 701/211 |
| 2004/0034464 A1 | * | 2/2004 | Yoshikawa et al. ......... 701/117 |
| 2004/0203918 A1 | * | 10/2004 | Moriguchi et al. ...... 455/456.1 |
| 2004/0236498 A1 | * | 11/2004 | Le et al. ..................... 701/200 |
| 2005/0079878 A1 | * | 4/2005 | Smith et al. ............. 455/456.5 |

* cited by examiner

*Primary Examiner*—Duc M. Nguyen
*Assistant Examiner*—Dai Phuong
(74) *Attorney, Agent, or Firm*—Stephen E. Feldman PC

(57) ABSTRACT

A system and a method configured for managing traffic. The traffic management system includes cellular telephones and a plurality of base stations. The cellular telephones define volume on a roadway and the traffic management system provides directions, traffic advisories, and traffic redirecting when traffic jams are detected along the navigation pathway using the cellular telephone system. Directions are communicated to the cellular telephone user by aural, tactile, and visual signals. The system can simply be a cellular telephone system or include additional peripheral devices such as a computer, headphone, visual display, and sound system. The user is able to redefine the desired destination or navigation pathway while en route by knowing traffic volume from cell phone use. A processing system is coupled to at least one of the base stations and provides service support including the tracking of historical data and developing the navigation pathway for the user. The method includes providing a traffic management system having a plurality of base stations connected to at least one processing station and a plurality of cellular telephone users, the traffic management system being suitable for identifying traffic congestion based on monitoring cellular telephone traffic. The processing station defines a navigation pathway and provides ongoing directional instructions regarding the pathway and any ensuing congestion.

20 Claims, 2 Drawing Sheets

SYSTEM FOR MANAGING TRAFFIC PATTERNS USING CELLULAR TELEPHONES

BACKGROUND

1. Technical Field

The present disclosure relates to systems and methods for determining and managing traffic patterns. More particularly, the present disclosure relates to determining the volume of traffic on a highway and managing the traffic patterns using knowledge from cellular phone type systems, and particularly to provide a travel plan to an individual planning to travel.

2. Background of Related Art

Traffic patterns are typically monitored by sensor systems such as cameras which provide the status of selected portions of roadways to a management center. The management centers communicate to the vehicular drivers the ensuing conditions using fixedly positioned programmable signs and dedicated AM radio stations. These traffic management systems, however, are vulnerable to the reliability of the sensors, signs, and the limitations of their positions relative to the traffic problems. Further, the camera sensor systems have limited visibility during many inclement weather conditions when the need to effectively locate and warn vehicular drivers of impending traffic problems is the greatest. The present system in using cell telephones avoids those problems, and is able to provide pre-arranged planned patterns of travel, to a person desiring to make such a trip.

In U.S. Pat. No. 5,563,783 to Song a vehicle locating system is described having a small device positioned in a car that is activated by a digital control transmission from a base station of a cellular phone system. The device in the car determines the vehicle location based on the received cellular phone signals, and then transmits that location back to the base station or another centrally located station. Song, however, is limited by its requirement to have a specific additional device covertly positioned in the vehicle and the limited application of that device to determine the location of the vehicle independent of a user's cellular phone.

In U.S. Pat. No. 5,327,144 to Stilp et al., a vehicle locating system is described utilizing specialized antennas and equipment for locating cellular telephones using their control channel emissions. Stilp et al. discusses using this information for determining velocity and estimating arrival times of a vehicle having a user with their cellular phone turned on. While Stilp et al. discusses how control channel intermittent transmissions can be used for locating a vehicle, it is limited to determining the position and velocity of a given vehicle. The patent does not disclose the monitoring of cellular phones to determine the volume of traffic on a particular roadway, and certainly does not disclose the input of the information from cell phone usage, to provide a traveler with a plan for a route with the least traffic.

A network based wireless locating system is discussed in U.S. Pat. No. 6,330,452B1 to Fattouche et al., wherein the static and dynamic positions of cellular telephones are located using cellular telephone reverse channel emissions. The reverse channel emissions are received at several antenna monitoring sites and the location of the cellular telephone identified using various analytical methods. Fattouche et al., is limited, however, to the determination of the position and velocity of the cellular telephones.

A continuing need exists for a system and method configured for effectively using traffic patterns and determining traffic volume through cellular telephone use, and providing a plan for traveling.

SUMMARY

A traffic management system including a base station and a processing station configured for receiving cellular telephone transmissions. The processing station is in communication with the base station and is configured for receiving data input from cellular telephones. The base stations use the data input to determine traffic volume and navigation pathways. The processing station and base stations are configured for providing directional guidance based on cellular telephone use.

A system for providing a plan for travel based on the volume of traffic on a roadway by monitoring the emissions of cell phones. The cell phones usually give off an electrical emission when they are in the off mode. However, if for any reason that signal no longer exists, then the system would monitor phones that were in the on mode. The invention also contemplates sending out a signal to cause the cell phones to respond if they are in the off mode, or not emitting.

The invention, together with attendant advantages, will be best understood by reference to the follow detailed description of the invention when used in conjunction with the figures below.

BRIEF DESCRIPTION OF THE DRAWINGS

Preferred embodiments of the presently disclosed system and method for managing traffic patterns are described herein with reference to the drawings, wherein.

DETAILED DESCRIPTION OF THE EMBODIMENTS

Figure 1:
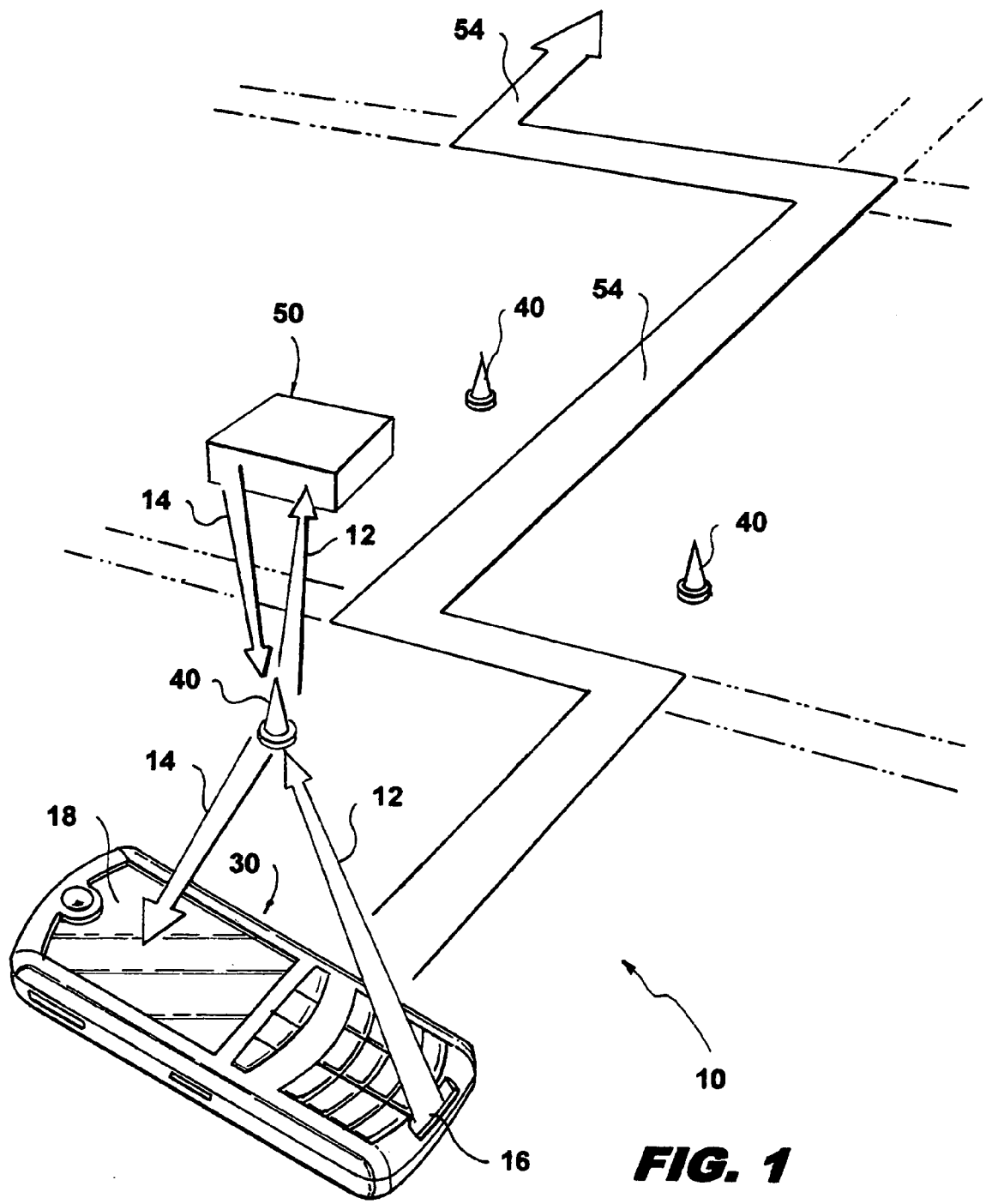
FIG. 1 is a simplified schematic diagram of a first embodiment of the invention.

Referring now in specific detail to the drawings in which like referenced numerals identify similar or identical elements throughout the several views, and initially to FIG. 1, a novel system and method for determining volume of traffic flow and managing traffic patterns, 10 is shown having a cellular telephone system, 20 including a cellular telephone, 30 operated by a user, a plurality of cellular telephone base stations, 40 and one or more processors or processing stations, 50 in accordance with the present disclosure. Processor, 50 can be combined with, integral with, or separate from one or more of base stations, 40.

Management system 10 is configured for locating, tracking, analyzing traffic patterns based on cellular telephone 30 emissions, and providing traffic volume guidance. Cellular telephones 30 as defined herein include mobile telephones using analog and/or digital signals operating within specified frequency bands or channels.

The cellular telephone based navigation includes cellular telephone 30, which may be used in conjunction with a vehicle, or integrated with a vehicle. Cellular telephone 30 supports can be configured to include or have connectivity with peripheral devices suitable for communication between a base station 40 and the user positioned in a vehicle including a head-set type device, a visual display, and or connections suitable for a visual display and/or sound system of the vehicle. Cellular telephones 30 is configured so that at least a portion of a communication interface for data input 12 and receiving data output 14 from base stations 40.

A cellular telephone user 30 provides data input 12 to base stations 40. Data input 12 includes providing identifying information associated with cellular telephone 30 such that a cellular telephone 30 can be adequately identified by base stations 40 and processing station 50. Data input 12 also may include defining a geographic location, date, and time of departure as well as a desired date/time of arrival at a destination suitable for defining a navigation pathway 54. Data input 12 can also identify preferred navigation pathways 54 route information such as the shortest distance, shortest time, and/or scenic routes, and a plan for the best route to take. The prime purpose is to determine the volume or amount of traffic on a roadway, and provide the best route to a driver in advance, or during the trip. Processing station 50 in combination with one or more base stations 40 are configured to identify and communicate as part of data output 14 the current location of the user as part of a confirmation or response to data input 12. This feature can also be utilized to advantageously include a find location mode to assist a lost cellular telephone user 30 in finding their present location and direction to their destination when a detour was taken from the navigation pathway 54.

Data input means 16 for management system 10 can be any standard data input device such as keyboard, mouse, pen, scanner, or verbal input into a computer system separate from or integral with cellular telephone 30. Additional data input means 16 includes directly inputting data using cellular telephone's 30 key/buttons, voice input through a microphone, menu selections, video, or any other standard data input 12 format.

Data output means 18 of cellular telephone 30 can include initiating aural, visual, and tactile outputs directly to cellular telephone 30 or an associated computer system. The outputs from data output means 18 serve to notify the user of cellular telephone 30 receiving data an can also actually initiate communicating that data to the user.

Thus, management system 10 provides the ability to guide cellular telephone 30 user to enter travel information and receive an initial set of route information as well as by dynamic ongoing routing instructions from base station 40. Management system 10 is cognizant of the position of cellular telephone 30 on the user's designated pathway toward the destination. When cellular telephone 30 is associated with a vehicle, management system 10 may be configured to identify the location of cellular telephone user 30 and by the number of cell phones it can identify any relevant traffic congestion along the designated roadway. From this information management system 10 can evaluate the volume of traffic and direct users to an alternative pathway to avoid known traffic jams. Management system 10 as configured herein is intended to encompassing aiding navigation in activities ranging from hiking to vehicular commuting to work to interstate travel, and particularly for planning vehicular trips, including car and truck trips.

In this system, base stations 40 are coupled with one or more processing stations 50 having a computer system configured as a primary computational and data storage source for management system 10. Processing station 50 receives data input 12 and general cellular telephone 30 user identification information sufficient for developing the navigation pathway 54 consistent with the user specified timing and route against current and predicted traffic patterns. Additional factors can include historical traffic patterns relating to seasons and holidays as well as weather predictions. The combination of these factors produces an analysis predicting an optimal shortest time pathway for a given set of cellular telephone 30 user defined parameters.

In addition, processing stations 50 provide base stations 40 positioned along navigation pathway 54 data such as the expected arrival time of cellular telephone 30 into the cells or zones of the respective different base stations 40. Thus, each en route base station 40 along navigation pathway 54 has an expected time of arrival, duration for tracing cellular telephone 30 within their cell, and expected time for exiting their cell. The ability of base station to monitor cellular telephone users 30—and report their status back to processing station 50 effectively creates a closed loop or feedback process between cellular telephone 30, base stations 40, and processing stations 50 verifying the en route status of cellular telephone 30 relative to navigation pathway 54 predicted position and key navigation point information such as an exit for a planned stop or change of roadway along navigation pathway 54.

The supporting data in the first preferred embodiment would remain substantially centralized in processing stations 50. When cellular telephones 30 are properly signaled by base station 40 data output 14 as a result of crossing a predetermined key navigation point or event along the route, cellular telephones 30 provide a response to the user alerting the user to a significant navigation pathway 54 event. As an example, data output 14 is configured to notify cellular telephone 30 upon entering within one mile of a turn from a first highway onto an exit for a second highway along the designated navigation pathway. The responses to the user can selectively include aural, tactile, or visual cues such as an arrow indicating the direction of the turn for the exit. The aural signal, for example, can be programmed to selectively override a cellular telephone 30 transmission or stereo system of the vehicle to or notify the cellular telephone user of an impending key navigation pathway 54 point.

Figure 2:
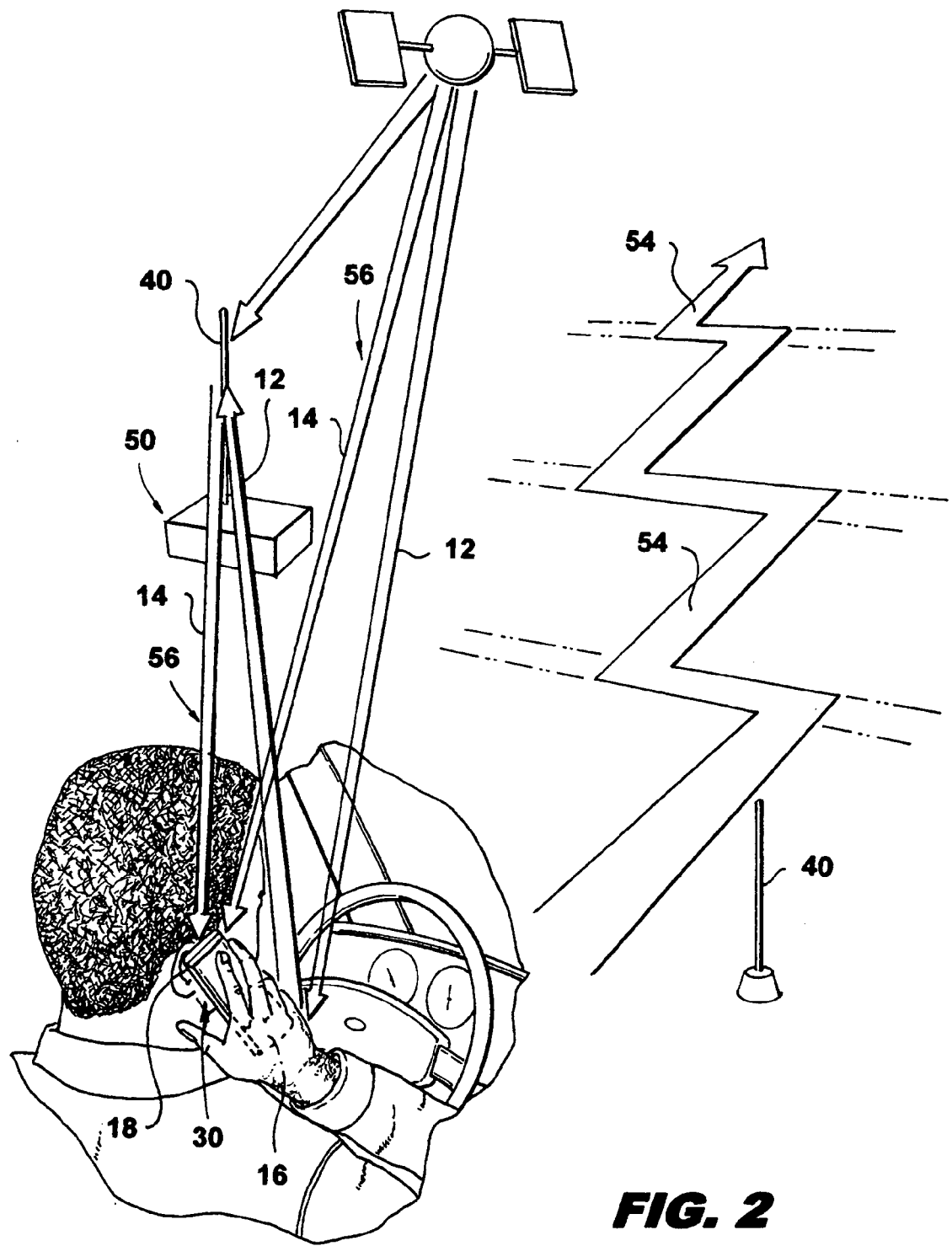
FIG. 2 is a simplified schematic diagram of a second embodiment of the invention.

Referring not to FIG. 2, a navigation pathway package 56 is forwarded from processing station 50 as data output 14 to cellular telephone 30. Cellular telephone 30 receiving the navigation pathway package 56 in data output means 18 and is configured to load the navigation pathway package 56 into memory using data input means 16 and/or in conjunction with a memory of a computer system positioned in the vehicle. Navigation pathway package 56 includes data input 12 and the data associated with navigation pathway 54 originally forwarded by cellular telephone 30 user plus addition data such as maps and any other supporting data associated with the designated pathway 54. The maps and data can be integrated with a visual display having suitable size/resolution, sound system, and any additional information for cellular telephone 30 locating and navigating functions. The additional information can include the location and identification codes of base stations 40 and key points or key navigation points along the pathway.

Management system 10 provides continuous ongoing navigational instructions through navigation pathway package 56 to the vehicular based cellular phone 30 that may be routinely updated from processing station 50 through data output means 18. This capability encompasses advantageously using a map based system for addressing dynamic situations such as those of identifying when to change roads along a navigation pathway, identifying traffic congestion, updating expected time of arrival, and offering alternative routes based on its knowledge of the surrounding road system utilization derived from cellular telephone 30 emissions.

In an additional embodiment, cellular telephone 30 is integrated with a global positioning system (GPS type device. In this embodiment, system 10 can be selectively configured to function as an independent verification of the GPS type device and/or to augment the location data, for example, provided by the GPS with aural and visual directional information.

Cellular telephone base stations 40 utilize the existing system of cellular telephone 30 service providers for the reception and initial processing of cellular telephones 30. Base stations 40 in this one preferred embodiment are augmented with additional processing capabilities to handle the tracking functions of potentially large numbers of cellular telephones 30 as well as the additional communication load required to support navigation. It is also envisioned that spaced base satellite stations can be used for detecting, locating, relaying, and aiding communication with cellular telephones 30 related to traffic management.

Select base stations 40 include or are connected with processing stations 50 configured as navigation pathway 54 service providers creating specifically tailored navigation packages 56 from standardized templates as well as depositories for navigation pathway packages 56 suitable for transfer to the user. Tailoring navigation pathway packages 56 includes integrating navigation data for the front end departure with navigation data of the standardized en route package and navigation data of the destination. Likely alternative routes are included in the package, especially where the foreseeable timing of the traveler would conflict with established heavy traffic and/or potential undesirable weather patterns.

Processing stations 50 also perform the function of receiving cellular telephone 30 user data from base stations 40 suitable for monitoring cellular telephone users 30 positions along their designated pathways. In addition, processing stations 50 identify traffic jams and the viability of alternative routes using general cellular telephone utilization data from base stations 40. The navigation package 12 is configurable to support a range of navigational options from pure cellular telephone 30 based navigation to full map based navigation suitable, for example, for integration with a GPS type system.

Referring now to FIGS. 1 and 2, traffic management system 10 in operation includes cellular telephone 30 users providing data input 12 to a processing station 50 for a travel event such as a time of departure, location of departure, destination, desired date and time or arrival, and type of route. The user can be positioned at their home or in any type of vehicle suitable for use with cellular telephone 30 from a bicycle or snow mobile to an automobile or boat. In addition, the user or traveler could be a pedestrian carrying cellular telephone 30.

Cellular telephone 30 locating process is accomplished by individual cellular telephone base stations 40 receiving cellular telephone 30 electronic signals as the signals progress along navigation pathway 54. The signals can be cellular telephone 30 reverse channel calls or control channel data verifying the acquiring of a particular base station 40. Base stations 40 process the signals from the cellular telephones 30 and determine the location and track the movement of cellular telephones 30 along their designated navigation pathways 54 or packages 56 within the respective cells of the different base stations 40. This is accomplished by base stations 40 and processing stations 50 advantageously using cellular telephone 30 users's known track along navigation pathway 54 in combination with measuring the power or strength of cellular telephone 30 signal received by the base station 40 to reliably predict the location of cellular telephone 30 relative to base station 40.

Alternative position locating methods include monitoring cellular telephone 30 emissions between different antenna stations 40 for time difference of arrival or phase difference of arrival techniques with triangulation or trilateration methods, for example, to locate the origin of cellular telephone 30 emissions.

Historical traffic patterns augment the analysis for navigation pathways 54 and/or packages 56. For example, traffic jams have demonstrated historical trends for developing at specific points and times with reasonable predictable consistency. This consistency when combined with simple direct measurements of elements such as the strength of the signals of cellular telephones 30 being received at even a single antenna station 40 are suitable for indicating traffic jams at the usual position. Additional refinements can include noting historical patterns for the rat of buildup, duration, and dissemination of cellular telephone 30 emissions during traffic jams. Further, refinement of historical traffic patterns can be combined with weather patterns, holidays, etc, to further clarify the disposition of traffic by alternative means.

In terms of tracking cellular telephone 30 users, certain types of cellular telephone 30 models have predictable power or signal strength levels which assist in identifying the initial and ongoing position of cellular telephone 30 users relative to base station 40. Further, cellular telephones 30 generally acquire base stations 40 with reasonably consistently at select points and predictable intervals along the track of navigation pathway 54.

Cellular telephone 30 navigation includes aural cues provided by navigation pathway package 56 including directional information based on the locating and tracking of the emissions of cellular telephone 30. Aural indices include statements warning of a specific amount of time or distance to an event such as a turn off of a given pathway or road. Cellular telephone 30 has connections for a head set or to the sound system of the vehicle suitable for providing quality voice signals for the user.

Exits and turns are highlighted along the navigation pathway 54 by processing stations 50 and can include the name and exit number from a highway to the new roadway, for example. A missed exit/turn will initiate an alarm in traffic management system 10 and reroute the user to the correct pathway and/or provide new navigation pathway package 56 information. For cellular telephones 30 having visual displays, an arrow or a similar graphic could provide directional indication in addition to aural cues. It is also readily envisioned that a map having a limited viewing area could be received and displayed by cellular telephone 30.

Additionally, navigation pathway package 54 and navigation pathway package 56 are configured to notify the user via cellular telephone 30 when a traffic jam is positioned further ahead on navigation pathway 54. Navigation package 56 is configured to graphically show and recommend the user of the vehicle to take an alternate pathway. Thu, processing station 50 monitors the general utilization/distribution of cellular telephones 30 within a given geographic area to identify and locate traffic jams based on a concentration of cellular telephone 30 users. This information is then used to divert cellular telephone 30 users to potentially various different alternate pathways to minimize the users's delay, reduce the concentration of cellular telephone 30 users, and avert additional traffic jam buildup.

Navigation pathway package 56 includes maps, supporting data for visual displays, and the accompanying sound configured for loading into the computer system of the vehicle. Alternatively, the user could receive one or more data on a storage means such as a CD or DVD or download and record data on the storage means that could then be input into the computer of the vehicle to support navigation along the pathway. It is also envisioned that a real time system can be configured to transmit graphic images and sound of navigation pathway package 56, for example, at suitable rates to support navigation.

Map based navigation depicts cellular telephone 30 user locations and key surrounding landmarks on the designated navigation pathway. The visual display includes directional information for the user via an arrow or a similar device that can be triggered by GPS coordinates and/or base station 40 signals. Map based navigation is configured to provide the sam cellular telephone 30 based aural cues as described previously.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure.

What is claimed is:

1. A system for providing traffic information for planning a trip comprising:
   cellular telephones;
   a base station, the base station having a zone of communication, whereby the base station creates tracking information pertaining to the amount of cellular telephones located in the zone of communication regardless of the cellular telephone status;
   transmitting means for transmitting a signal to cause cellular telephones that are in an off position to respond;
   a processing station configured for receiving cellular telephone emissions, the processing station being in communication with the base station, the processing station being configured for receiving data input and tracking information from cellular telephones to the base stations, the processing station determining traffic speed by analyzing the tracking information; and
   notification means for sending a navigation pathway package to at least one cellular telephone, the navigation pathway package including information about an upcoming traffic jam, alternate route information, maps, supporting data for visual displays, amount of time to a turn off, amount of time to a given pathway, distance to a turn-off, distance to a given pathway, directional information, information about surrounding landmarks and combinations thereof.

2. The system providing for traffic information of claim 1, wherein the data input is sent to the base station by the cellular telephones and defines the amount of cell phones located in vehicles on a roadway.

3. The system for providing traffic information of claim 2, wherein defining the navigation pathway includes defining a date and a time of departure from a geographic location.

4. The system of claim 2, wherein the data input includes route information.

5. The system of claim 1, wherein the cellular telephone users are positioned in a vehicle.

6. The system of claim 5, wherein the processing station defines a navigation pathway package suitable for transfer to a computer system positioned in the vehicle suitable for at least storing and displaying map and navigation information, the computer system in the vehicle being integrated with the at lease one cellular telephone.

7. The system of claim 1, wherein the at least one cellular telephone user is not in a vehicle.

8. The system of claim 1, wherein the locating of the at least one cellular telephone is determined using the navigation pathway defined by the at least one cellular telephone user, the emissions of the at least one cellular telephone, and one base station.

9. A management system using cellular telephones comprising:
   a traffic management system including
   cellular telephone defining data input;
   a plurality of base stations, each base station having a zone of communication, each base station creating tracking information pertaining to the amount of cellular telephones located in the zone of communication regardless of the cellular telephone status, the base stations being connected with at least one processing station and at least one cellular telephone user, the processing station being configured for receiving the tracking information and the data input from the cellular telephone user, and the processing defining a navigation pathway for the cellular telephone user at least partially based on the data input from the cellular telephone user and traffic speed information determined by the processing station through the use of the tracking information;
   transmitting means for transmitting a signal to cause cellular telephones that are in an off position to respond; and
   notification means for sending a navigation pathway package to at least one cellular telephone, the navigation pathway package including information about an upcoming traffic jam, alternate route information, maps, supporting data for visual displays, amount of time to a specific turn off, amount of time to a given pathway, distance to a specific turn-off, distance to a given pathway, directional information, surrounding landmarks and combinations thereof.

10. The system claim 9, wherein the data input is sent to one of the plurality of base stations by the least one cellular telephone user and defines at least a geographic location of a point of destination, a time of arrival, and a date of arrival.

11. The system of claim 10, wherein defining the navigation pathway includes defining a date and a time of departure from a geographic location.

12. The system of claim 10, wherein the data input includes route information.

13. The system of claim 9, wherein the cellular telephone user is positioned in a vehicle.

14. The system of claim 13, wherein the processing station defines a navigation pathway package suitable for transfer to a computer system positioned in the vehicle configured for at least storing and displaying navigation package information including maps, the computer system being integrated with the cellular telephone.

15. The system of claim 9, wherein the traffic management system provides corrective directions when a turn along the navigation pathway was missed by the at least one cellular telephone user.

16. The system of claim 9, wherein the locating of the cellular telephone is determined using the navigation pathway defined by the at least on cellular telephone user, the emissions of the at least one cellular telephone, and one base station.

17. A method using cellular telephones for managing traffic comprising:
providing a traffic management system including
a plurality of base stations connected to at least one processing station, each base station having a zone of communication, each base station creating tracking information pertaining to the amount of cellular telephones located in the zone of communication regardless of cellular telephone status, whereby the processing station determines traffic volume by analyzing the tracking information,
transmitting means for transmitting a signal to cause cellular telephones that are in an off position to respond,
a plurality of cellular telephone users, the traffic management system being suitable for identifying traffic congestion and traffic speed based on monitoring cellular telephone traffic; sending data input from the cellular telephone users to the at least one processing station; developing navigation pathways in the processing station based at least partially on the data input from the cellular telephone users; inputting data from the cellular telephone users along the navigation pathway to the base stations, the information being suitable for the at least one processing station to track the position of the cellular telephone user on the navigation pathway using a single base; and providing data output from the at least one processing station to the cellular telephone users including providing notice of ensuing key navigation points along the navigation pathway to the cellular telephone users along the navigation pathway station and redirecting the cellular telephone user on the navigation pathway in relation to the traffic congestion detected by the plurality of base stations; and
notification means for sending a navigation pathway package to at least one cellular telephone, the navigation pathway package including information about an upcoming traffic jam, alternate route information, maps, supporting data for visual displays, amount of time to a turn off, amount of time to a given pathway, distance to a turn-off, distance to a given pathway, directional information, information about surrounding landmarks and combinations thereof.

18. The method of claim 17, wherein the step of providing data from the at least one processing station includes providing navigation pathway information recorded on a medium suitable for use in a vehicle.

19. The method of claim 18, wherein the step of providing data from the at least one processing station includes providing navigation pathway information including Global Positioning System information to the cellular telephone user, the navigation pathway information including maps in a form suitable for use on video display in a vehicle.

20. The method of claim 17, wherein the step of providing includes a satellite system configured for communicating between the cellular telephone and the at least one of processing station.

* * * * *